US012664436B2

(12) United States Patent
Mopur et al.

(10) Patent No.: US 12,664,436 B2
(45) Date of Patent: Jun. 23, 2026

(54) ANOMALIES AND DRIFT DETECTION IN DECENTRALIZED LEARNING ENVIRONMENTS

(71) Applicant: HEWLETT PACKARD ENTERPRISE DEVELOPMENT LP, Spring, TX (US)

(72) Inventors: Satish Kumar Mopur, Bangalore (IN); Krishnaprasad Lingadahalli Shastry, Bangalore (IN); Sathyanarayanan Manamohan, Bangalore (IN); Ravi Sarveswara, Bangalore (IN); Gunalan Perumal Vijayan, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 775 days.

(21) Appl. No.: 17/987,518

(22) Filed: Nov. 15, 2022

(65) Prior Publication Data

US 2024/0160939 A1 May 16, 2024

(51) Int. Cl.
*G06N 3/088* (2023.01)
(52) U.S. Cl.
CPC .................................... *G06N 3/088* (2013.01)
(58) Field of Classification Search
CPC .............................. G06N 3/045; G06N 3/088
See application file for complete search history.

(56) References Cited

FOREIGN PATENT DOCUMENTS

WO WO-2022178197 A1 * 8/2022 ............. G08B 17/00

OTHER PUBLICATIONS

Qin et al., "A Selective Model Aggregation Approach in Federated Learning for Online Anomaly Detection", Dec. 28, 2020, 2020 International Conferences on Internet of Things, Physical and Social Computing (CPSCom) and IEEE . . . Congress on Cybermatics (Cybermatics), pp. 684-691. (Year: 2020).*
Gerz et al., "A Comparative Study and a New Industrial Platform for Decentralized Anomaly Detection Using Machine Learning Algorithms", Jul. 2022, Conference: IEEE World Congress on Computational Intelligence, pp. 1-9. (Year: 2022).*

(Continued)

*Primary Examiner* — Brent Johnston Hoover
(74) *Attorney, Agent, or Firm* — Sheppard Mullin Richter & Hampton LLP

(57) ABSTRACT

Anomalies and drift detection in decentralized learning environments. The method includes deploying at a first node, (1) a local unsupervised autoencoder, trained at the first node, along with a local training data reference baseline for the first node, and (2) a global unsupervised autoencoder trained across a plurality of nodes, along with a corresponding global training data reference baseline. Production data at the first node is processed with local and global ML models deployed by a user. At least one of local and global anomaly data regarding anomalous production data or local and global drift data regarding drifting production data is derived based on the local and global training data reference baselines, respectively. At least one of the local anomaly data is compared with the global anomaly data or the local drift data with the global drift data for assessing impact of anomalies/drift on the ML models.

15 Claims, 9 Drawing Sheets

(56) References Cited

OTHER PUBLICATIONS

Canonaco et al., "Adaptive Federated Learning in Presence of Concept Drift", International Joint Conference on Neural Networks (IJCNN), 2021, 7 pages.

Estiri et al., "Attentive Federated Learning for Concept Drift in Distributed 5G Edge Networks", Nov. 14, 2021, 6 pages.

Kingma et al., "An Introduction to Variational Autoencoders", Foundations and Trends in Machine Learning, Dec. 11, 2019, 89 pages.

"Alibi Detect", available online at <https://docs.seldon.ai/alibi-detect>, retrieved on Oct. 2025, 2 pages.

"Fiddler's Accelerated MLOps At A Glance", available online at <https://web.archive.org/web/20210514001444/https://www.fiddler.ai/>, May 14, 2021, 8 pages.

Charakorn et al., "An Explicit Local and Global Representation Disentanglement Framework with Applications in Deep Clustering and Unsupervised Object Detection", Feb. 24, 2020, 13 pages.

Enterprise-Class AI Explainability, "The TruEra Model Intelligence Platform", available online at <https://web.archive.org/web/20210506050621/https://truera.com/>, May 6, 2021, 13 pages.

Github, "HewlettPackard / swarm-learning", available online <https://web.archive.org/web/20210618142615/https://github.com/HewlettPackard/swarm-learning>, Jun. 18, 2021, 5 pages.

IN Application, "Managing Data Drift and Outliers for Machine Learning Models Trained for Image Classification",202141000574, Jan. 6, 2021, 710229874IN01, 32 pages.

Nardi et al., "Centralised vs decentralised anomaly detection: when local and imbalanced data are bene cial", Proceedings of Machine Learning Research 154:720, 2021, 14 pages.

* cited by examiner

400

LOCALLY TRAINING A USER LOCAL ML MODEL AND A LOCAL VAE USING TRAINING DATA TO DERIVE A LOCAL BASELINE    402

STORING THE DERIVED LOCAL BASELINE    404

TRAINING A USER GLOBAL ML MODEL AND A GLOBAL VAE ACROSS A PLURALITY OF PARTICIPANT NODES TO DERIVE A GLOBAL BASELINE    406

STORING THE DERIVED GLOBAL BASELINE    408

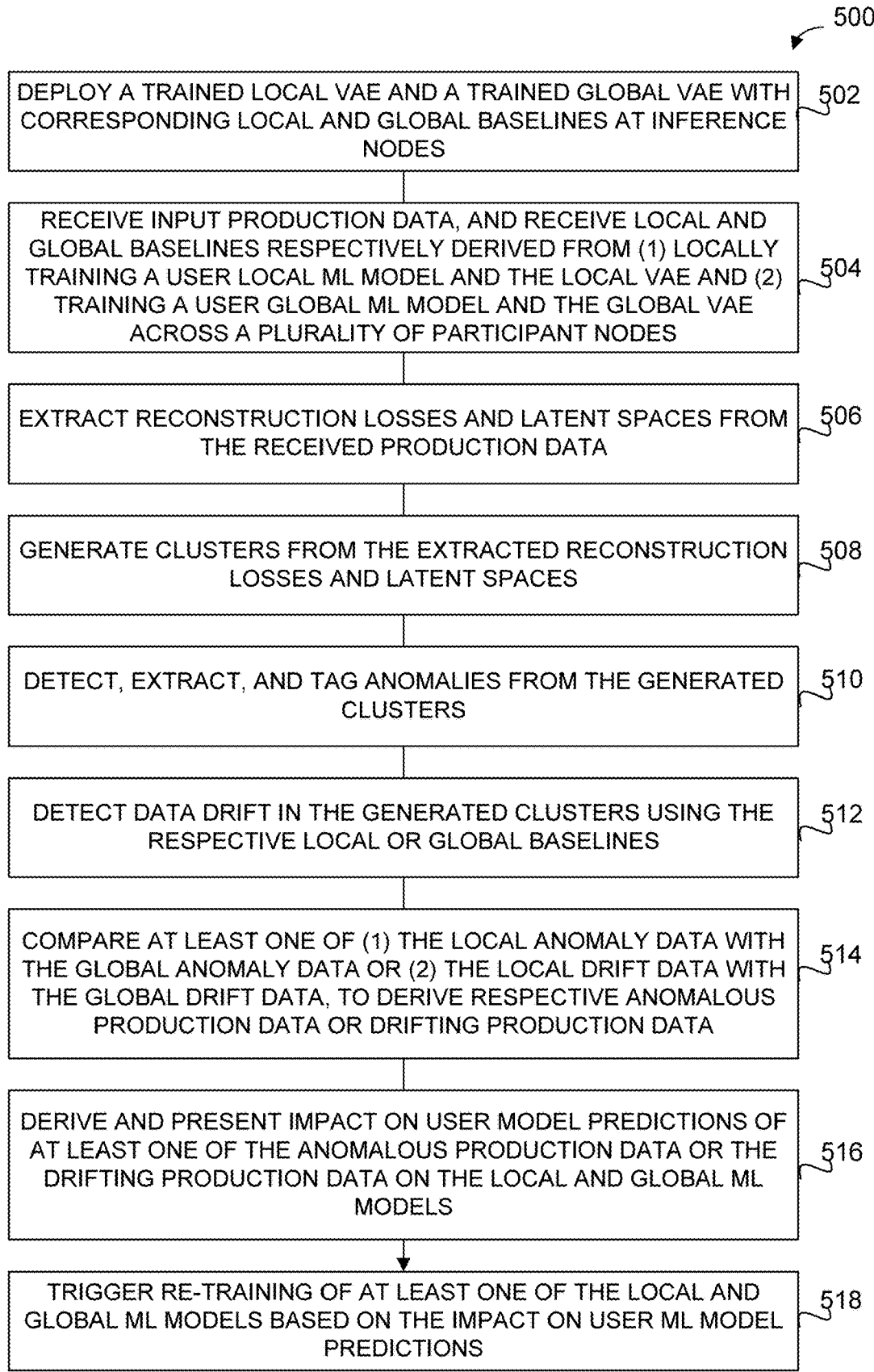

500

DEPLOY A TRAINED LOCAL VAE AND A TRAINED GLOBAL VAE WITH CORRESPONDING LOCAL AND GLOBAL BASELINES AT INFERENCE NODES —502

RECEIVE INPUT PRODUCTION DATA, AND RECEIVE LOCAL AND GLOBAL BASELINES RESPECTIVELY DERIVED FROM (1) LOCALLY TRAINING A USER LOCAL ML MODEL AND THE LOCAL VAE AND (2) TRAINING A USER GLOBAL ML MODEL AND THE GLOBAL VAE ACROSS A PLURALITY OF PARTICIPANT NODES —504

EXTRACT RECONSTRUCTION LOSSES AND LATENT SPACES FROM THE RECEIVED PRODUCTION DATA —506

GENERATE CLUSTERS FROM THE EXTRACTED RECONSTRUCTION LOSSES AND LATENT SPACES —508

DETECT, EXTRACT, AND TAG ANOMALIES FROM THE GENERATED CLUSTERS —510

DETECT DATA DRIFT IN THE GENERATED CLUSTERS USING THE RESPECTIVE LOCAL OR GLOBAL BASELINES —512

COMPARE AT LEAST ONE OF (1) THE LOCAL ANOMALY DATA WITH THE GLOBAL ANOMALY DATA OR (2) THE LOCAL DRIFT DATA WITH THE GLOBAL DRIFT DATA, TO DERIVE RESPECTIVE ANOMALOUS PRODUCTION DATA OR DRIFTING PRODUCTION DATA —514

DERIVE AND PRESENT IMPACT ON USER MODEL PREDICTIONS OF AT LEAST ONE OF THE ANOMALOUS PRODUCTION DATA OR THE DRIFTING PRODUCTION DATA ON THE LOCAL AND GLOBAL ML MODELS —516

TRIGGER RE-TRAINING OF AT LEAST ONE OF THE LOCAL AND GLOBAL ML MODELS BASED ON THE IMPACT ON USER ML MODEL PREDICTIONS —518

FIG. 5

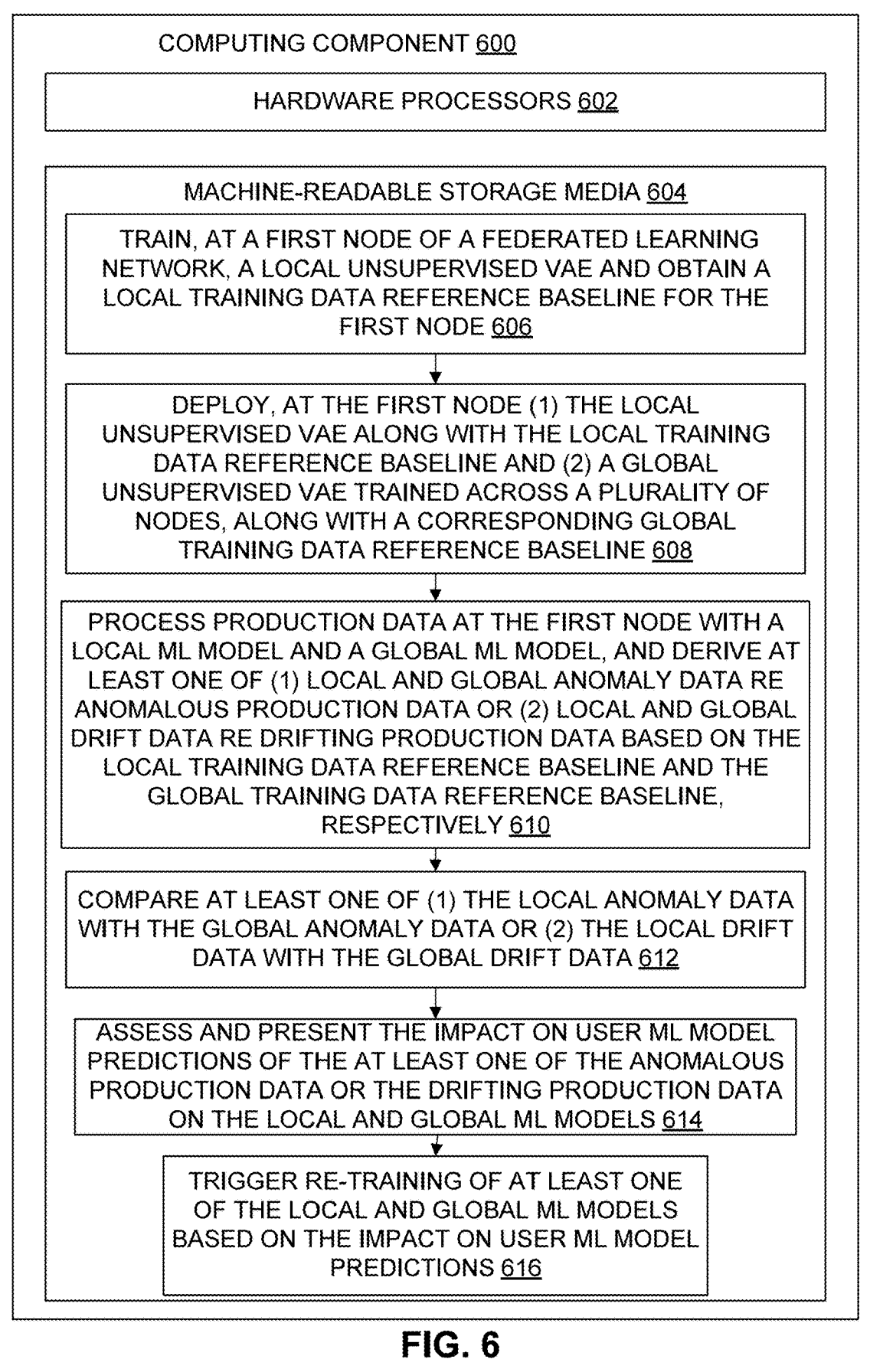

COMPUTING COMPONENT 600

HARDWARE PROCESSORS 602

MACHINE-READABLE STORAGE MEDIA 604

TRAIN, AT A FIRST NODE OF A FEDERATED LEARNING NETWORK, A LOCAL UNSUPERVISED VAE AND OBTAIN A LOCAL TRAINING DATA REFERENCE BASELINE FOR THE FIRST NODE 606

DEPLOY, AT THE FIRST NODE (1) THE LOCAL UNSUPERVISED VAE ALONG WITH THE LOCAL TRAINING DATA REFERENCE BASELINE AND (2) A GLOBAL UNSUPERVISED VAE TRAINED ACROSS A PLURALITY OF NODES, ALONG WITH A CORRESPONDING GLOBAL TRAINING DATA REFERENCE BASELINE 608

PROCESS PRODUCTION DATA AT THE FIRST NODE WITH A LOCAL ML MODEL AND A GLOBAL ML MODEL, AND DERIVE AT LEAST ONE OF (1) LOCAL AND GLOBAL ANOMALY DATA RE ANOMALOUS PRODUCTION DATA OR (2) LOCAL AND GLOBAL DRIFT DATA RE DRIFTING PRODUCTION DATA BASED ON THE LOCAL TRAINING DATA REFERENCE BASELINE AND THE GLOBAL TRAINING DATA REFERENCE BASELINE, RESPECTIVELY 610

COMPARE AT LEAST ONE OF (1) THE LOCAL ANOMALY DATA WITH THE GLOBAL ANOMALY DATA OR (2) THE LOCAL DRIFT DATA WITH THE GLOBAL DRIFT DATA 612

ASSESS AND PRESENT THE IMPACT ON USER ML MODEL PREDICTIONS OF THE AT LEAST ONE OF THE ANOMALOUS PRODUCTION DATA OR THE DRIFTING PRODUCTION DATA ON THE LOCAL AND GLOBAL ML MODELS 614

TRIGGER RE-TRAINING OF AT LEAST ONE OF THE LOCAL AND GLOBAL ML MODELS BASED ON THE IMPACT ON USER ML MODEL PREDICTIONS 616

FIG. 6

ANOMALIES AND DRIFT DETECTION IN DECENTRALIZED LEARNING ENVIRONMENTS

CROSS-REFERENCE TO RELATED APPLICATION

The present disclosure discusses Swarm Learning. Additional information discussing Swarm Learning is described in greater detail in U.S. patent application Ser. No. 17/205, 632 filed on Mar. 18, 2021 and published as U.S. Patent Application Publication No. US 2021/0398017, the contents of which are incorporated by reference herein.

BACKGROUND

Machine learning (ML) generally involves a computer-implemented process that builds a model using sample data (e.g., training data) in order to make predictions or decisions without being explicitly programmed to do so. ML processes are used in a wide variety of applications, particularly where it is difficult or not feasible to develop conventional algorithms to perform various computing tasks.

Blockchain is a tamper-proof, decentralized ledger that establishes a level of trust for the exchange of value without the use of intermediaries. A blockchain can be used to record and provide proof of any transaction, and is updated every time a transaction occurs.

A particular type of ML process, called supervised machine learning, uses labeled datasets to train algorithms to classify data or predict outcomes. The process for setting up the supervised machine learning generally involves (a) centralizing a large data repository, (b) acquiring a ground truth for these data, defined as the reality or correct answer that is being modeled with the supervised machine learning algorithm, and (c) employing the ground truth to train the ML model for the classification task. However, this framework poses significant practical challenges, including data trustworthiness, data privacy, and security challenges that come with creating a large central data repository for training the ML models.

As traditional ML involves uploading local datasets to a centralized datastore, there are limitations to the traditional model, especially when there are many distributed data sources. Decentralized ML is an approach that allows coordinated ML training and re-training without sharing the local datasets. Federated Learning and Swarm Learning are types of decentralized learning.

In more detail, Federated Learning (also known as collaborative learning) is a type of ML process that trains an ML model across multiple decentralized devices holding local data samples. Often, the decentralized devices can be prevented, by policy or by practical considerations, from exchanging their datasets. This approach, in which coordinated training is effected without sharing local datasets, stands in contrast to traditional centralized ML techniques where local datasets are uploaded to one device.

Thus, federated learning enables multiple devices to build a common, robust ML model without sharing data, thereby allowing to address critical issues such as data privacy, data security, data access rights, and access to heterogeneous data. Its applications are spread over a number of industries including but not limited to defense, telecommunications, Internet of Things (IoT), pharmaceutics, and health care.

However, concerns remain in federated learning, such as privacy and other concerns. For example, the sources that provide data for federated learning may be unreliable. The sources may be vulnerable to network issues since they commonly rely on less powerful communication media (i.e., Wi-Fi) or battery-powered systems (i.e., smartphones and IoT devices) compared to traditional centralized ML where nodes are typically data centers that have powerful computational capabilities and are connected to one another with fast networks.

Swarm Learning extends federated learning and obviates the need for a central server as in traditional ML. In Swarm Learning a decentralized, privacy-preserving ML framework utilizes the computing power at, or near, the distributed data sources to run the ML algorithms that train the models. Model training occurs at the edge where data is most recent. In Swarm Learning, central authority is substituted by a smart contract executing within the blockchain. In general a smart contract is a program stored on a blockchain that contains a set of rules by which the parties or participants to the smart contract agree to interact with each other. The program runs when predetermined condition(s) are met. Accordingly, smart contracts are typically used to automate the execution of an agreement so that all participants can be immediately certain of the outcome or the predetermined condition(s), without any intermediary's involvement or time loss. Smart contracts can also automate a workflow, triggering the next action when conditions are met. Each node updates the blockchain, which then triggers a smart contract to execute a code.

In Swarm Learning each node possessing local training data trains a common ML model without sharing the local training data with any other node or entity in the swarm blockchain network. This is accomplished by sharing parameters (or weights) derived from training the common ML model using the local training data. In this way, the learned insights regarding raw data (instead of the raw data itself) can be shared amongst participants or collaborating peers/nodes, which aids in protecting data against privacy breaches. Swarm Learning as described herein leverages blockchain technology to allow for decentralized control, monetization, and ensuring of trust and security amongst individual nodes. Accordingly, decentralized learning encompasses Federated Learning. Swarm Learning enables federation with a privacy preserving approach wherein the aggregator can run on any node and is not tied to a single server.

BRIEF DESCRIPTION OF THE DRAWINGS

The present disclosure, in accordance with one or more various examples, is described in detail with reference to the following figures. The figures are provided for purposes of illustration only and merely depict typical examples.

FIG. 5 illustrates an anomalies and drift detection production method in accordance with an example of the disclosed technology.

FIG. 6 is an example computing component that may be used to implement anomalies and drift detection functions of a node in accordance with an example of the disclosed technology.

Figure 1A:
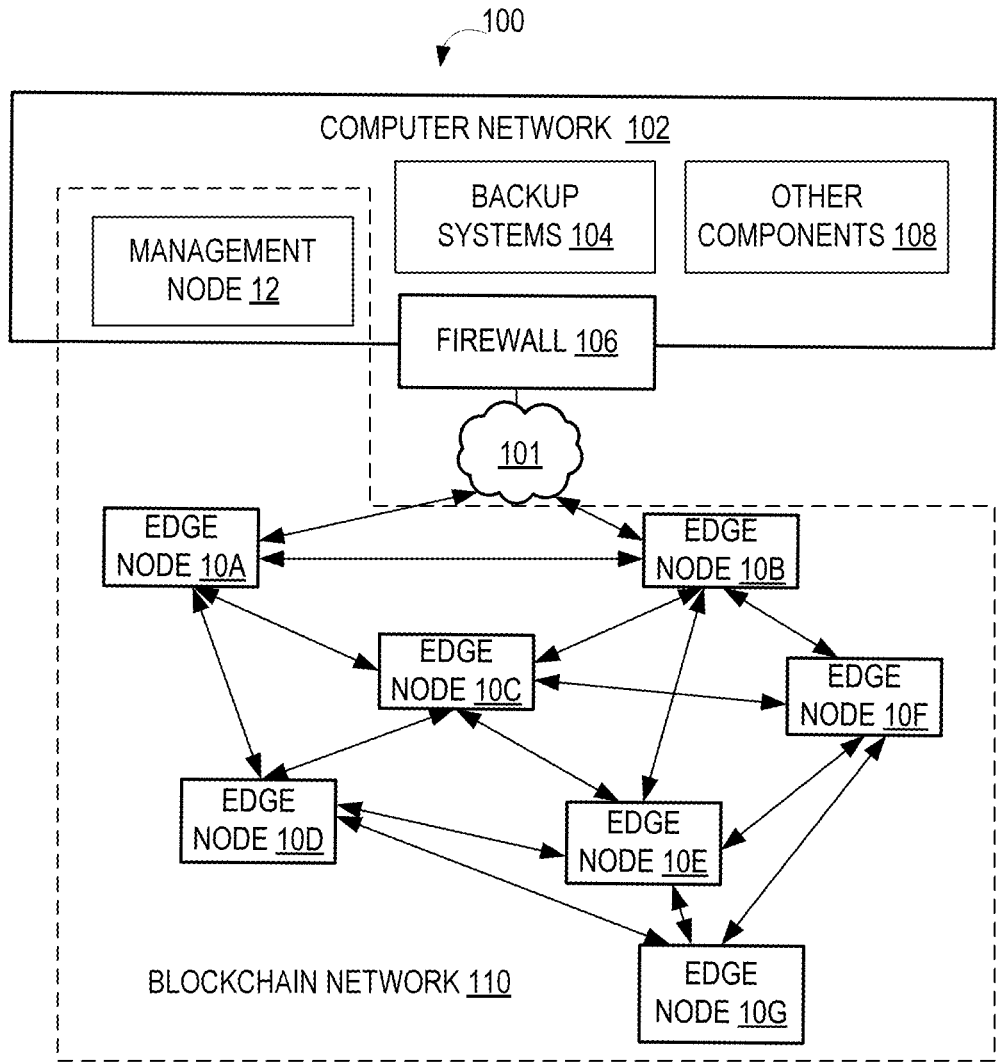
FIG. 1A illustrates an example of a system of decentralized management of device assets outside a computer network, such as edge networks, in which each node can perform anomalies and drift detection, in accordance with an embodiment of the disclosed technology.

The figures are not exhaustive and do not limit the present disclosure to the precise form disclosed.

DETAILED DESCRIPTION

As noted above, decentralized learning has benefits beyond just saving time and bandwidth. There are privacy and other benefits as well. However, there are also drawbacks. For example, decentralized approaches often assume that local data samples are identically distributed. The assumption of "independent and identically distributed data" (IID data) is common in Machine Learning algorithms. "Independent" means that samples taken from individual random variables are independent of each other. A distribution is "identical" if the samples come from the same random variable. However, the IID assumptions about the datasets that can allow current versions of decentralized ML to work are not always accurate, and when they aren't, the result can be a very poorly performing ML model. The disclosed technology allows decentralized ML to work when data is not IID across distributed devices, and preserves benefits of decentralized ML.

Use of Artificial Intelligence (AI) has pervaded across virtually all industries including for example health care, manufacturing, finance, retail, life sciences, and many more. Deep Learning (DL) with large datasets is a predominant technology for solving real-world problems in domains including but not limited to the above, spanning image classification, time series prediction, and Natural Language Processing (NLP), as examples. However, largescale datasets are not always available at individual business environments. As noted above, to address data privacy concerns of participants, federated learning solutions such as swarm learning incorporate privacy preservation techniques enabling decentralized global model training, with ownership of the data remaining local to a participant. Enterprises are using federated learning and swarm learning to build a generic global model without compromising privacy or security.

However, any model that has been trained for high accuracy and performance will tend to suffer degradation in prediction if the training data no longer represents a real-world data distribution. Training data not complying with IID can occur due to causes such as anomalies or outliers in the data that are different from rest of the data, or data drift that has caused the data to shift over time from input data during production.

In more detail, in some applications, the analysis being performed on gathered data at edge nodes or servers can be used to train the ML models. Various algorithms can improve the functioning of the edge systems, as defined by certain parameters. However, in real-world applications, dynamic behaviors of systems may impact outputs of the ML models. Dynamic behaviors may come from various sources, including for example sensor inefficiency, denaturing of sensors, transient changes in measured parameters, and any introduction of new parameters to be analyzed. The dynamic behaviors may appear in the data as drifts, anomalies, or outliers. For example, a drift can occur on input data streams or predicted output data, or a concept shift can occur in a relationship between input data streams and outputs, over a period of time. "Drift" may refer to the statistical properties of a target variable (which the ML model is trying to predict) that can change over time in unforeseen ways. The change over time can cause the predictions to become less accurate over time. In one example drift might be due to bias in the data collection phase. "Anomalies" and "outliers" may refer to data items that deviate significantly from the majority of the other data items. These anomalies or outliers can occur because of noise or unexpected data points that influence model prediction behavior and may perform deeper examination. Anomalies or outliers present in input data streams and data stream drifts could affect prediction behavior of ML models which are pre-trained using labelled data. In this application, "anomalies" and "outliers" are used interchangeably.

Drift can occur whenever a data pattern changes over time at inference or production. Training data can be quite different from production data. Drift, anomalies, or outliers in the data can cause less reliable data to be used in distributed training. Thus, when locally training models, local nodes can experience different anomalies or data drift, and re-training at the local level will not address anomalies or drift at other nodes. If global re-training is initiated, failure to detect and assess the impact of anomalies or drift can result in malicious data propagation throughout the learning network. Furthermore, models are trained at nodes using localized data, and thus existing anomaly or drift detection solutions will tend to lack accuracy due to the localized training data being limited.

As a more specific example of technical challenges that can occur when a ML model trained in a federated learning network is deployed in production, consider the use case of AI in healthcare environments with potential applications in areas such as chest diseases. Participating nodes in federated learning use historical-labeled disease data that is available for labeling chest diseases to train a global federated ML model to classify chest diseases (e.g., pneumonia, cardiomegaly, atelectasis, etc.). Subsequently, if one node observes data relevant to variants of a new disease or illness such as (when it first started to appear) Covid-19, the ML model predictions can be inaccurate as data associated with such new disease or illness can constitute a drift from the historical-labeled disease data. Thus if only the local ML model on this node is re-trained on the new data, then this node will correctly identify and classify Covid-19; however, a ML model of the other participating nodes will not be able to correctly identify and classify Covid-19, as these other nodes have not been trained on the new data. This can result in inaccurate medical diagnoses at these other participating nodes, even though one node has the accurate medical diagnosis, thereby breaking collaboration across the participating nodes. Stated another way, each node may see a different amount of data. One node may misclassify the new disease and then have to correct this misclassification. However, corrective actions are local to the node, and so a technical problem is presented, namely, how to propagate the correction to other nodes and re-train the models across the nodes with the new data. In essence, the following scenarios are encountered that can pose technical challenges.

First, one or more nodes may encounter anomalies or data drift over time. There can be different anomalies or drift data features and patterns at different nodes. There can also be new data that might appear at a node as drift for not falling within historical-labeled data but may in fact be correct, such as a new variant of Covid-19. Addressing performance decay by local re-training will not propagate the benefit to other participant nodes. Second, it is important to understand whether a local drift is impacting ML model performance, thereby necessitating a re-train. If periodic re-training is initiated naïvely for models across nodes, i.e., without detecting and assessing the impact of anomalies or drift, potential malicious data propagation across the decentralized network can result, which can be catastrophic across the participating nodes. Third, in a case of decentralized edge training, because data is distributed and not available centrally as a reference for data drift detection, existing anomaly and drift detection solutions will tend to suffer in accuracy, without access to the distributed data.

Accordingly, decentralized learning, while providing many advantages over localized-only learning, also creates certain technical challenges. And using Deep Learning among a group of participating nodes in a collaborative manner to develop a ML model that addresses challenges such as the above can be of significant value. Existing approaches are lacking in anomaly or drift detection in decentralized learning environments. Existing approaches are also lacking in the ability to provide users with visibility or control on new data to be used to trigger a new collaborative learning, such as when one node identifies a new Covid-19 variant but this new data is not propagated to other nodes.

Technical solutions are realized throughout the application. To address the above technical issues with federated learning, a new pipeline/workflow is disclosed. At each node of a federated learning network, a local variational autoencoder (VAE) is trained using training data of that node to derive a local baseline. As explained further herein, a variational autoencoder is used in an example as the primary engine for enabling anomaly and drift detection in federated learning environments. A VAE is an unsupervised artificial neural network that learns how to efficiently compress and encode data into a latent space and reconstruct the data back from the reduced encoded representation. One reason a VAE is chosen is because the encoded representation learned by the autoencoder is specific to the training data distribution in a continuous latent space. This enables effectively calculating the differences in latent space distribution of input data using global and local baselines. This behavior is leveraged in examples for effective detection of differences in drift and anomalies helping a user in assessing the impact on the global model.

In an example, a node has training data comprising Chest X-Ray images with disease classes={Normal, Viral Pneumonia}, and a second node has training data comprising Chest X-Ray images with disease classes={Normal, Cardiomegaly}. In this example, a local VAE is trained using training data of the individual nodes to derive respective local baselines, and a global VAE is trained across the decentralized network to derive a global baseline. The global VAE is trained using the training data across all participant nodes. In this way, anomalies and drift can be assessed from both local and global perspectives. After training, the local and global VAEs are deployed in production with their respective local and global baselines along with ML models at each node. When deployed, the local and global VAEs detect anomalies/data drift relative to the respective local and global baselines based on actual production/live data. As an example, one node may receive X-Ray images of disease class=COVID-19 with high lung opacity, with the image count gradually increasing over a duration (days or weeks). Since the VAE has not been trained with COVID-19 images, these images are detected as drift as they are increasing in count over the duration. After detection, a comparator quantifies the data drift. As another example, Chest X-Ray images with noise due to faulty image scanning equipment may be a part of the production data, and detected as anomalies. A user may then make informed decisions regarding whether re-training should be initiated. This results in a continuous training with the ability to derive a continually updated global model across all participating nodes.

Clustering can be applied to the reconstruction losses and latent space extracted from the local/global VAEs. Clustering can reveal anomalies in the data such as cluster outliers, which may in one example be classified by the number of data points away from a high density cluster and the distances therefrom. Clustering can also reveal data drift in assessing changing cluster density using a statistical analysis ensemble, described in more detail with respect to FIG. 5. Once local and global data drifts and anomalies are detected, they can be compared. Anomalous or outlier data can be tagged as such. Regarding drift assessments, an outcome can be predicted. For example, possible outcomes may be that there is no actual drift or that there is a high probability that a federated learning model will not be impacted, among others. Suggested actions, such as re-training, or discarding anomalous production data and/or drifting production data, may also be presented based on the assessments or predicted outcomes.

As noted above, the disclosed technology in some examples may be applied at participant nodes that are under control of a network such as, e.g., a federated learning, distributed learning, decentralized learning, or swarm learning network. In some examples the network is a blockchain network, but implementations of the disclosed technology are not limited to a blockchain network. These nodes can be referred to as "edge" systems as they may be placed at or near the boundary where the real world (e.g., user computing devices, IoT devices, or other user-accessible network devices) interacts with large information technology infrastructure. For example, autonomous ground vehicles currently include more than one computing device that can communicate with fixed server assets. More broadly, edge devices such as IoT devices in various contexts such as consumer electronics, appliances, or drones are increasingly equipped with computational and network capacity. Another example includes real-time traffic management in smart cities, which divert their data to a data center. However, as described herein, these edge devices may be decentralized for efficiency and scale to perform collaborative machine learning as nodes in a blockchain network.

FIGS. 1A-1D illustrate example system and system components (management node, edge node, blockchain interface layer) of decentralized management of device assets outside a computer network including detection of anomalies and drift, in accordance with an embodiment of the disclosed technology.

More specifically, FIG. 1A illustrates an example of a system 100 of decentralized management of device assets outside a computer network 102 in which each node can perform anomalies and drift detection, according to an implementation of the disclosed technology. System 100 may include a blockchain network 110. The blockchain network 110 may include a plurality of nodes that are connected to one another using one or more connection protocols, including a peer-to-peer connection protocol. The nodes of the blockchain network 110 may include a management node 12 and edge nodes 10. The particular number of, configuration of, and connections between the edge nodes 10 may vary. As such, the arrangement of the edge nodes 10 shown in FIG. 1A is for illustrative purposes only.

The management node 12 is part of and operates within a firewall 106 of computer network 102 and the edge nodes 10 operate outside the firewall. As alluded to above, and as will be described in greater detail below, such edge nodes 10 may contribute data that can be used to train a local instance of a global ML model in a decentralized learning or swarm learning context. The computer network 102 may also include one or more backup systems 104 that provides failover protection for the management node 12 and/or other components 108 operating within the computer network. The components of the computer network 102 may communicate with one another via a local area network ("LAN"). The components of the computer network 102 may communicate with devices outside the computer network 102 through the firewall 106. The firewall 106 may be configured as a software firewall and/or a hardware firewall device. The firewall 106 may include or connect with a network switch device that routes network traffic into and out of the computer network via the firewall. The network 101 may include a wide area network ("WAN") that connects devices outside the firewall 106.

Examples of further details of a management node 12 will now be described with reference to FIG. 1B. The management node 12 may include one or more processors 20 (also interchangeably referred to herein as processors 20, processor(s) 20, or processor 20 for convenience), one or more storage devices 40, and/or other components. The processor 20 may be programmed by one or more computer program instructions. For example, the processor 20 may be programmed to execute a management user interface 22 (illustrated as "management user interface 22"), a controller 24, a blockchain interface layer 30, and/or other instructions to perform various operations, each of which are described in greater detail herein. As used herein, for convenience, the various instructions will be described as performing an operation, when, in fact, the various instructions program the processors 20 (and therefore management node 12) to perform the operation.

The management user interface 22 may provide an interface, such as a graphical user interface, a command line interface, and/or other type of interface configured to receive management option inputs. For instance, a user such as a system administrator may use the management user interface 22 to input management operations to be conducted on one or more of the edge nodes 10 of the blockchain network 110, or to input an edge node to be added. In this manner, the user may manage edge nodes 10 based on change requests originating from within the computer network 102.

The controller 24 may obtain management operations to be performed and may communicate them to the relevant edge nodes 10. The management operations may be obtained from the management user interface 22 and/or a global policy 48. Controller 24 may communicate the management operations using the blockchain interface layer 30. For example, the controller 24 may write the management operations into a blockchain transaction that is broadcast to the edge nodes 10. The blockchain transaction may be broadcast using a multicast protocol to several or all edge nodes 10. In some instances, the blockchain transaction may be broadcast using peer-to-peer networking in which the management node 12 acts as a peer to broadcast the transaction to at least one other peer (in this case, an edge node 10), which broadcasts the transaction to other peers and so on. In some implementations, the controller 24 may wait until a blockchain transaction is signed by an edge node 10 as described herein before writing the transaction to a block (also referred to herein as a "ledger block") of the distributed ledger 42. In these implementations, the edge nodes 10 may obtain management operations directly from the broadcasted transaction. In other implementations, the controller 24 may write the transaction to a block of the distributed ledger 42. In these implementations, the edge nodes 10 may obtain management operations by obtaining the current (in other words latest) block that references transactions having management operations.

In whichever manner the controller 24 broadcasts the management operations to edge nodes 10 using the blockchain interface layer 30, the controller 24 may do so to in a manner that is directed all edge nodes 10. For example, a management operation of "check status" may be directed to all nodes of the blockchain network 110 so that each edge node is instructed to perform a status check. Each edge node 10 will then perform the status check and broadcast its state indicating the results of the status check (or other management operation as described below).

In some instances, the controller 24 may target one or more edge nodes 10 to receive a management operation. In these implementations, the controller 24 may generate a blockchain transaction and/or a block on the distributed ledger 42 directed to the targeted edge node(s) 10. For instance, the controller 24 may encode an identifier of the edge node 10 that is targeted. Alternatively or additionally, the controller 24 may encode a device type that targets certain types of edge nodes 10 that should perform management operations. Still other examples include locations that should be targeted such that edge nodes 10 in certain geolocations are targeted. The smart contracts 44 may include rules, which each edge node 10 follows, that direct the nodes 10 to inspect transactions and/or blocks to determine whether the node 10 should apply a management operation contained in the transaction and/or block. In some implementations, the controller 24 may encrypt the management operation to be performed with a target edge node's 10 public key such that only the target edge node 10 can decrypt the management operation with its private key.

In some instances, certain management operations may be executed periodically without user intervention. For example, controller 24 may execute a daemon or other process that periodically causes a status check from all edges nodes 10 to be executed. This daemon may periodically generate relevant change requests, which are issued to the edge nodes 10 and tracked via the distributed ledger 42.

In an implementation, the controller 24 may enforce global policy 48 by ensuring that the state of the network complies with the global policy 48. For instance, the controller 24 may periodically obtain the current system state from the distributed ledger 42. As noted elsewhere, state transitions of the edge nodes 10 may be recorded on the distributed ledger 42. Alternatively or additionally, the result of status checks may be written to the distributed ledger 42, indicating the current state of the system. The controller 24 may compare the current system state (such as state of the blockchain network 110) with the global policy 48, which may specify a desired state of the system. The desired state may include a macro state of the system as a whole and/or a micro-state of any individual or group of edge nodes 10. Any discrepancies may be noted and an edge node 10 in non-compliance may be targeted for executing a management operation that will resolve the non-compliance. In some instances, the smart contracts 44 and/or global policy 48 may encode rules that specify when a non-complying edge node 10 should be taken offline. For instance, the rules may specify an edge node 10 that continues to be in non-compliance after N number of blocks have been written to the distributed ledger 42 should be taken offline. Other parameters may specify such removal as well. The foregoing may ensure recurring policy enforcement and compliance using the blockchain interface layer 30.

In one embodiment, in connection with certain types of management operations, the controller 24 may make available files for download. For instance, operating system images, software updates, new software, and/or other downloadable files or data may be made available for edge nodes 10 to download in connection with a management operation. As will be described below, in some embodiments, downloadable files may include files containing particular encryption keys, merged parameters, etc. This may ensure that the distributed ledger 42 itself does not have to store such files or data but stores an immutable record of current files or data that should be used (as well as historic listing of such files or data).

The blockchain interface layer 30 may be used to interface with the distributed ledger 42 in accordance with the smart contracts 44. The blockchain interface layer 30 is described with reference to FIG. 1D below.

The storage devices 40 may store a distributed ledger 42, smart contracts 44, node keys 46, and/or other data. The distributed ledger 42 may include a series of blocks of data that reference at least another block, such as a previous block. In this manner, the blocks of data may be chained together. An example of a distributed ledger is described in the well-known white paper "Bitcoin: A Peer-to-Peer Electronic Cash System," by Satoshi Nakamoto (bitcoin.org), the contents of which are incorporated by reference in its entirety herein. The distributed ledger 42 may store blocks that indicate a state of an edge node 10 relating to its configuration or other management information.

The smart contracts 44 may include rules that configure nodes to behave in certain ways in relation to decentralized management of edge nodes. For example, the rules may specify deterministic state transitions, which nodes may enroll to participate in decentralized management, rules for implementing a change request issued by the management node 12, and/or other actions that an edge node 10 or management node 12 may take for decentralized management. In some embodiments, such rules may specify when to elect a merge leader, what edge node 10 to exclude from decryptor election, etc.

The node keys 46 may store public encryption keys of edge nodes 10 in association with their identities (such as Internet Protocol or other addresses and/or identifying information). In this manner, in some implementations, change requests may be targeted to specific edge nodes 10 and encrypted using the target edge node's public key.

The global policy 48 may store a security or other policy for the system. The global policy 48 may include, for example, network configuration settings, security configuration settings, operating system settings, application settings, policy rules, and/or other policy information for devices managed by the management node 12.

The management node 12 also includes an anomalies and drift detection training module 80 and an anomalies and drift detection production module 82, each of which will be described in detail below.

Examples of further details of an edge node 10 will now be described with reference to FIG. 1C. An edge node 10 may be a fixed or mobile device. While only one of the edge nodes 10 is illustrated in detail in the figures, each of the edge nodes 10 may be configured in the manner illustrated. The edges nodes 10 may communicate with one another in a peer-to-peer manner. The edge nodes 10 may each include one or more processors 50 (also interchangeably referred to herein as processors 50, processor(s) 50, or processor 50 for convenience), one or more storage devices 70, and/or other components.

The processor 50 may be programmed by one or more computer program instructions. For example, the processor 50 may be programmed to execute a blockchain agent 52, a configuration manager 54, a blockchain interface layer 30, and/or other instructions to perform various operations, each of which are described in greater detail herein. As used herein, for convenience, the various instructions will be described as performing an operation, when, in fact, the various instructions program the processors 50 (and therefore edge node 10) to perform the operation.

The blockchain agent 52 may use the blockchain interface layer 30 to communicate with other edge nodes 10 and/or management node 12. The blockchain interface layer 30, described with reference to FIG. 1D, may operate in the same manner at management node 12 and edge node 10 to communicate with the blockchain network (other than being able to write to the distributed ledger 42). For example, the blockchain agent 52 may obtain an updated copy of the distributed ledger 42 from one or more other edge nodes 10 and/or management node 12. The blockchain agent 52 may also obtain management operations from the distributed ledger 42 written by the management node 12. In this manner, the management node 12 may communicate management operations to be performed at an edge node 10 through the distributed ledger 42.

The configuration manager 54 may obtain one or more management operations from the blockchain agent 52. The configuration manager 54 may apply the one or more management operations to the edge node 10. In some instances, the configuration manager 54 may apply the management operations without a determination of whether to do so. In other instances, the configuration manager 54 may consult one or more local policies to ensure that the edge node 10 can comply with the one or more management operations. The local policies may be encoded by the smart contracts 44. Alternatively or additionally, some local policies may be stored in a local policy 78, which is not necessarily shared with other edge nodes 10. In other words local policy 78 may be defined specifically at an edge node 10 at which it is stored.

Once the configuration manager 54 has acted on the one or more management operations (whether by applying them or not), the blockchain agent 52 may broadcast its state to other nodes of the blockchain network 110. For example, the blockchain agent 52 may generate and transmit a blockchain transaction that indicates the state of the edge node 10 (such as whether, how, and/or when the one or more management operations have been applied). The blockchain transaction may include information identifying the management operation was (or was not) performed. For example, the information identifying the management operation may be a block identifier (such as a block hash) that identifies the block from which the management operations was obtained. In this manner, the blockchain transaction indicating a node's state may record the management operation that was (or was not) applied.

For implementations in which management operations are targeted to an edge node 10 and encrypted using the targeted edge node 10's public key 72, the blockchain agent 52 may decrypt the management operations using the edge node 10's private key 74. In some implementations, the blockchain agent 52 may digitally sign a blockchain transaction from the management node 12 that includes the management operation. For instance, the management node 12 may generate a transaction directed to the edge node 10 and sign the transaction using the management node 12's public key.

The management node 12 may then write the signed transaction to the distributed ledger 42 to create an immutable record of the management operation and state change of the targeted edge node. In this manner, the transaction may be securely proven to have been executed by the edge node 10. It should be noted that the edge node 10 need not specifically be targeted in order to sign the transaction so as to create a record of the edge node's 10 state in a transaction and therefore block.

Upon receipt of a transaction, the edge node 10 apply the management operation and indicate that it has successfully done so by signing the transaction with the edge node's private key 74. The management node 12 may write this transaction into the distributed ledger 42, creating a secure, immutable record that proves that the edge node 10 received and applied the management operation. In some implementations, an edge node 10 may be associated with a series of transactions such that each transaction may refer to a previous transaction hash. The transactions may be written to the distributed ledger 42 by the management node 12, creating an immutable and historic record of transactions for a given edge node 10.

In an implementation, the configuration manager 54 may periodically ensure compliance with the current state of the system. For instance, the smart contracts 44 may encode rules that specify what events trigger such checking. The events may include a restart, a new initialization, a passage of a period of time, a number of blocks written to the distributed ledger 42, a security event such as detection of malware, an input from a user specifying that the check should occur, and/or other event that can trigger compliance evaluation. To evaluate compliance, the configuration manager 54 may determine whether any current management operations (as defined by the latest block encoding such operations), including global ones and those specifically targeted to the edge node 10. If so, the configuration manager 54 may determine whether they should have been but were not implemented. If not, the configuration manager 54 may implement the management operations. In this manner, the edge nodes 10 may self-enforce the current management operations (as defined by the current system state).

The storage devices 70 may store an edge node's copy of the distributed ledger 42, the edge node's copy of smart contracts 44, the edge node's public key 72, the edge node's private key 74, and/or other data.

The edge node 10 also includes an anomalies and drift detection training module 80 and an anomalies and drift detection production module 82, each of which will be described in detail below.

Figure 1C:
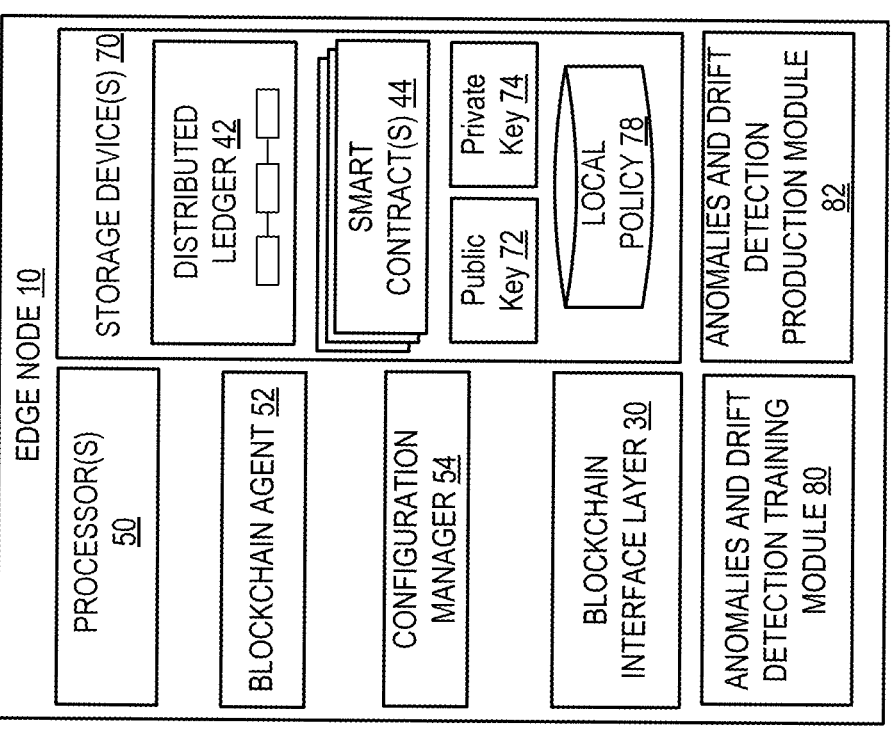
FIG. 1C illustrates an example of an edge node that performs anomalies and drift detection in a distributed blockchain network for decentralized management of device assets outside a computer network, such as edge networks, in accordance with an embodiment of the disclosed technology.
Figure 1B:
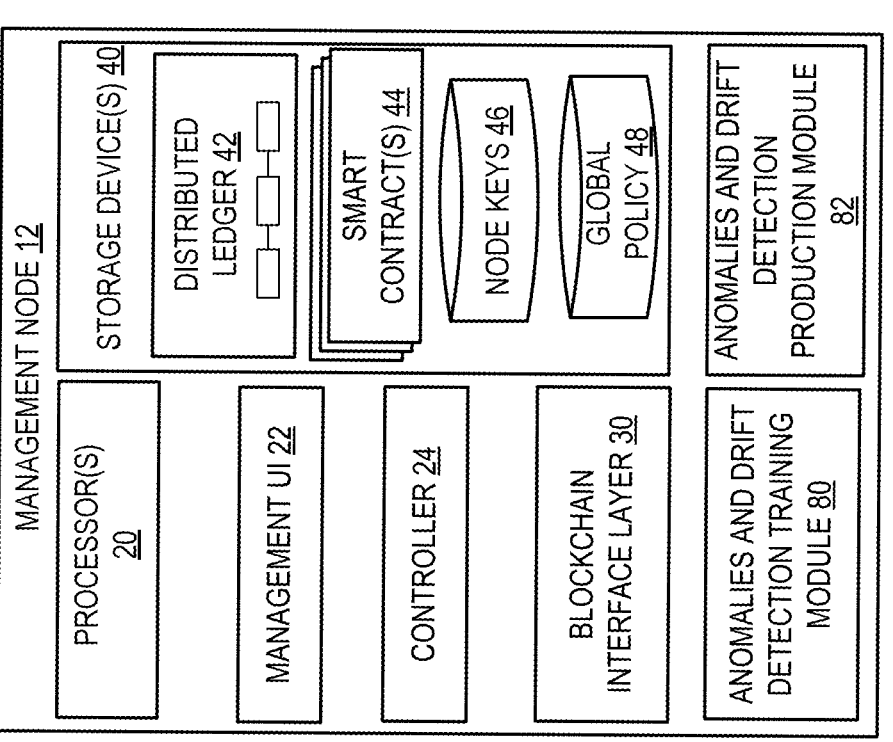
FIG. 1B illustrates an example of a management node that performs anomalies and drift detection in a distributed blockchain network for decentralized management of device assets outside a computer network, such as edge networks, in accordance with an embodiment of the disclosed technology.
Figure 1D:
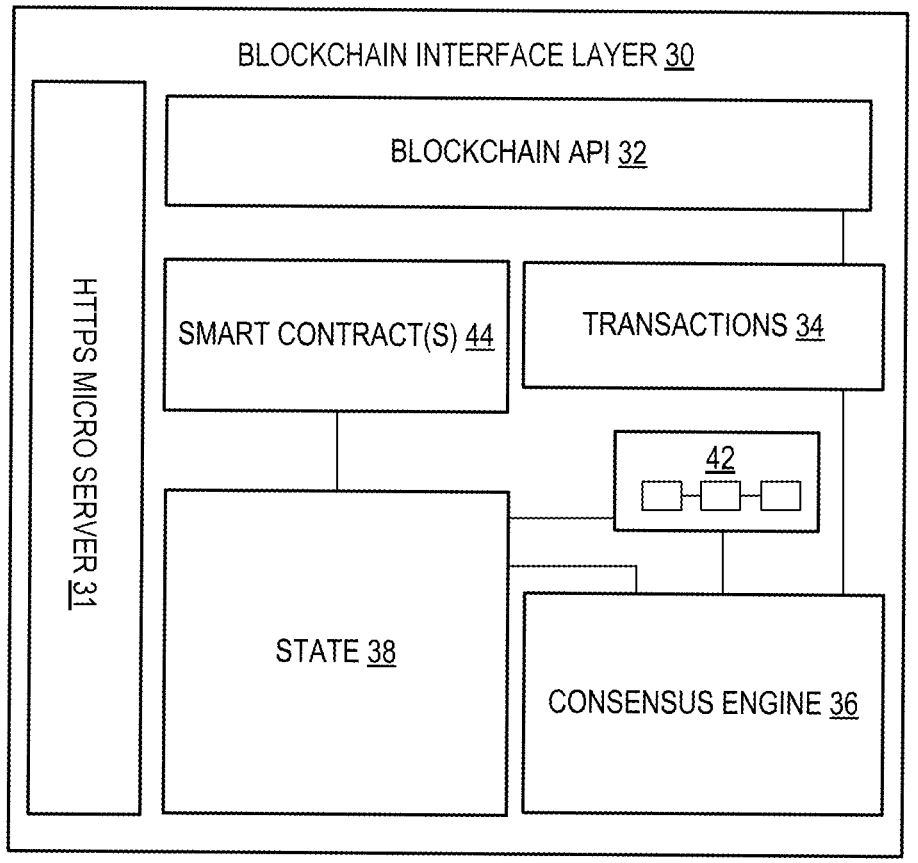
FIG. 1D illustrates an example of a blockchain interface layer for decentralized management of device assets outside a computer network in accordance with an embodiment of the disclosed technology.

Reference will now be made to FIG. 1D, which illustrates an example of the blockchain interface layer 30. Each of the edge nodes 10 and the management node 12 may implement the blockchain interface layer 30, except that the edge nodes 10 may not have permission to write to the distributed ledger 42. The blockchain interface layer 30 may include a messaging interface used to communicate with the blockchain network 110. The messaging interface may be configured as a Secure Hypertext Transmission Protocol ("HTTPS") micro server 31. Other types of messaging interfaces may be used as well. The blockchain interface layer 30 may use a blockchain API 32 to make calls for blockchain functions based on a blockchain specification. Examples of blockchain functions include, but are not limited to, reading and writing blockchain transactions 34 and reading and writing blockchain blocks to the distributed ledger 42. One example of a blockchain specification is the Ethereum specification. Other blockchain specifications may be used as well. Consensus engine 36 may include functions that make consensus decisions, such as whether to enroll a node to participate in decentralized management of the edge nodes 10. The state of a node 10 can be reflected by state 38.

Although illustrated in FIGS. 1B and 1C as a single component, a management node 12 or edge node 10, respectively, may include a plurality of individual components (such as computer devices) each programmed with at least some of the functions described herein. The one or more processors 20 or 50 may each include one or more physical processors that are programmed by computer program instructions. The various instructions described herein are provided for illustrative purposes. Other configurations and numbers of instructions may be used, so long as the processor(s) 20 or 50 are programmed to perform the functions described herein.

Furthermore, it should be appreciated that although the various functions are illustrated in FIGS. 1B and 1C as being co-located within a single processing unit, in implementations in which processor(s) 20 or 50 includes multiple processing units, one or more instructions may be executed remotely from the other instructions.

The various instructions for performing various functions described herein may be stored in a storage device 40 or 70, which may comprise random access memory (RAM), read only memory (ROM), and/or other memory. Storage device 40 or 70 may store the computer program instructions (such as the aforementioned instructions) to be executed by processor 20 or 50, respectively, as well as data that may be manipulated by processor 20 or 50. Storage device 40 or 70 may comprise one or more non-transitory machine-readable storage media such as floppy disks, hard disks, optical disks, tapes, or other physical storage media for storing computer-executable instructions and/or data.

The distributed ledger 42, transaction queue, smart contracts 44, management operations to be performed, and/or other information described herein may be stored in various storage devices such as storage device 40 or 70. Other storage may be used as well, depending on the particular storage and retrieval requirements. For example, the various information described herein may be stored using one or more databases. The databases may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

The management node 12 and edge nodes 10 illustrated in FIGS. 1C and 1B, respectively, may be coupled to other nodes via a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1A, as well as in other figures, different numbers of entities than those depicted may be used. Furthermore, according to various implementations, the components described herein may be implemented in hardware and/or software that configure hardware.

Figure 2:
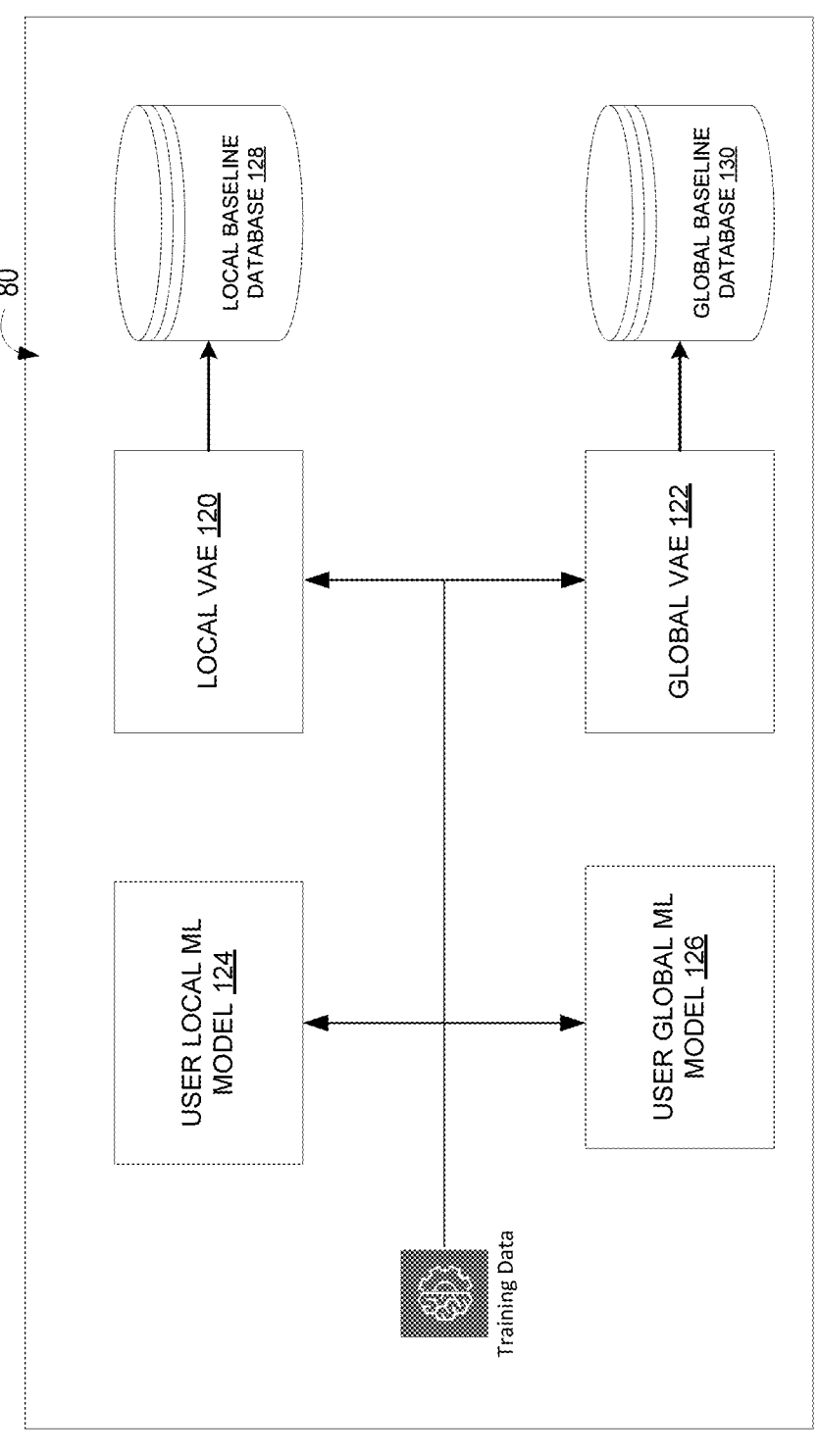
FIG. 2 shows an anomalies and drift detection training module in accordance with an example of the disclosed technology.
Figure 3:
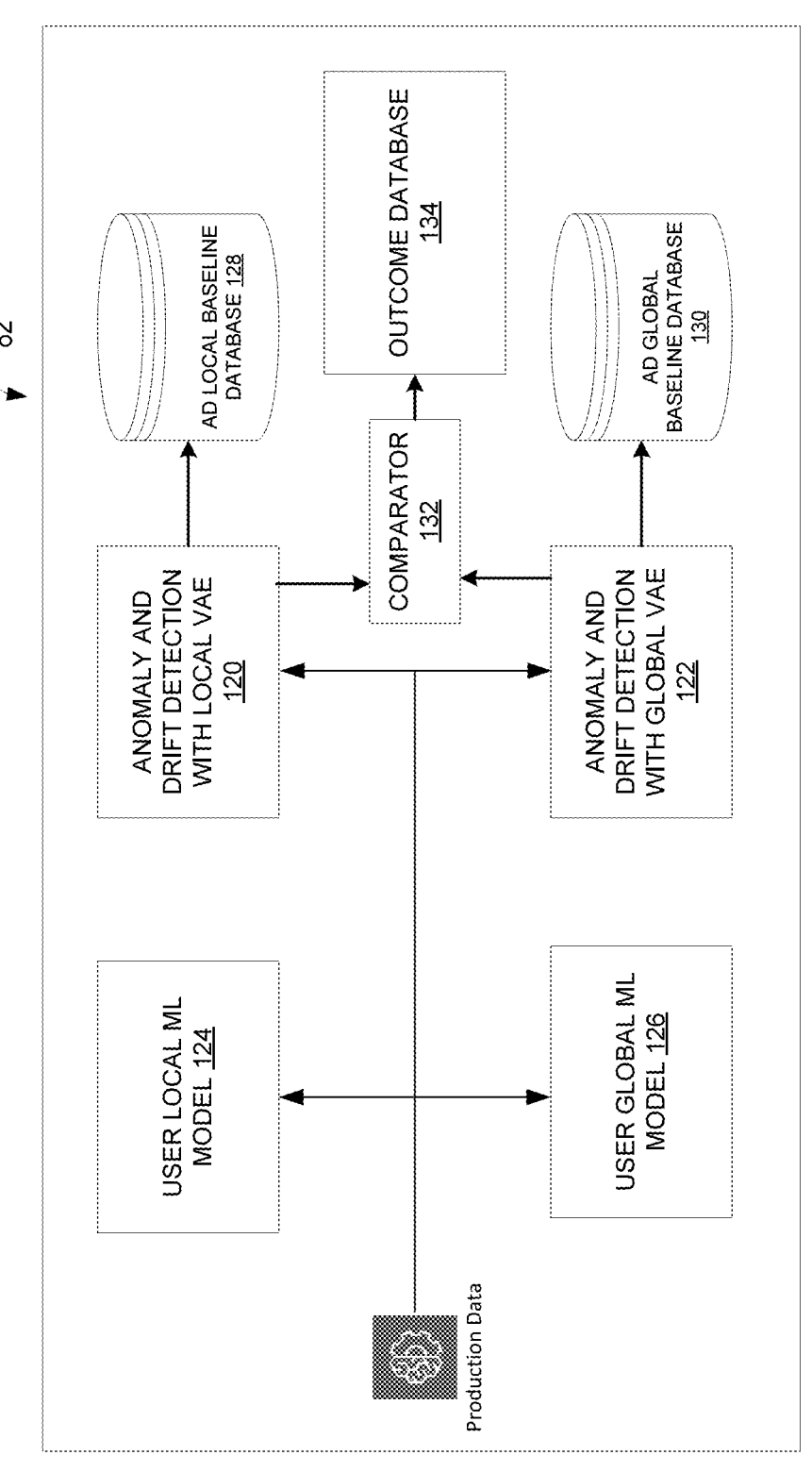
FIG. 3 shows an anomalies and drift detection production module in accordance with an example of the disclosed technology.

Referring next to FIGS. 2-3, the disclosed technology provides a technical solution that addresses above-noted technical challenges by, in one example, enabling timely detection of anomalies and drift on production data trained in distributed or decentralized environments such as federated learning or swarm learning environments. The disclosed technology in an example comprises a new pipeline with an unsupervised learning technique that uses a variational autoencoder (VAE) in conjunction with a clustering and statistical ensemble (explained more in FIG. 5) to detect and assess anomalies and drifting data at each participant node in the environment. The drift analysis with associated model prediction of ML models enables users to initiate continual federated learning. Accordingly, by virtue of the features of the disclosed technology, consistency in the quality of global model performance can be sustained through continuous learning in collaborative environments. Suitable VAEs for use with the disclosed technology are discussed in further detail below.

FIG. 2 shows an anomalies and drift detection training module 80 in accordance with an example of the disclosed technology. The anomalies and drift detection training module 80 may be implemented for example in a management node or edge node of a decentralized or distributed network, such as management node 12 or edge node 10 of FIGS. 1B and 1C, respectively. In this way the anomalies and drift detection training module 80 may make use of one or more components of FIGS. 1A-1D, including but not limited to processor(s) 20, controller 24, blockchain interface layer 30, storage device(s) 40, distributed ledger 42, and smart contract(s) 44 of management node 12, or processor(s) 50, blockchain interface layer 30, distributed ledger 42, smart contracts 44, storage device(s) 70 of edge node 10. The anomalies and drift detection training module 80 may be implemented for example in a federated learning or swarm learning framework. Of course, these are just example implementations and the disclosed technology is not limited thereto.

The anomalies and drift detection training module 80 provides a training environment at each participant node. The anomalies and drift detection training module 80 includes a first variational autoencoder (VAE) 120 which is a local VAE, a second variational autoencoder (VAE) 122 which is a global VAE, a user local ML model 124, and a user global ML model 126.

The user local ML model 124 and the local VAE 120 are locally trained using training data to derive a local baseline that is stored in a local baseline database 128. The local VAE 120 is trained with the same training data as the user local ML model 124, until it can reconstruct the input images with stabilized minimum or reduced loss values. These values, along with the corresponding latent space of the local VAE 120, are referred to as the local baseline that provides a representative reference of training data of that node. The user global ML model 126 and the global VAE 122 are collaboratively trained across a plurality of participant nodes (which may be either management node 12 or edge nodes 10) using the training data to derive a global baseline that is stored in a global baseline database 130. The stabilized minimum or reduced loss values along with the corresponding latent space of the global VAE 122 are referred to as the global baseline that provides a representative approximate reference of the training data across some or all participant nodes.

The local and global VAEs 120, 122 extract stabilized reconstruction losses and latent space as the respective local and global baselines. The latent space of a VAE is the encoded representation learned by the Encoder of the Autoencoder and represents the training data distribution statistically. Accordingly, anomalies and drift can be assessed from both local and global perspectives. The local and global baselines are used as references for anomalies and drift detection at production. The local and global baselines and the respective trained local and global VAEs 120, 122 are packaged for deployment at the production environment provided by the anomalies and drift detection production module 82.

FIG. 3 shows an anomalies and drift detection production module 82 in accordance with an example of the disclosed technology. The anomalies and drift detection production module 82 may be implemented for example in a management node or edge node of a decentralized or distributed network such as management node 12 or edge node 10 of FIGS. 1B and 1C, respectively. In this way the anomalies and drift detection production module 80 may make use of one or more components of FIGS. 1A-1D, including but not limited to processor(s) 20, controller 24, blockchain interface layer 30, storage device(s) 40, distributed ledger 42, and smart contract(s) 44 of management node 12, or processor(s) 50, blockchain interface layer 30, distributed ledger 42, smart contracts 44, storage device(s) 70 of edge node 10. The anomalies and drift detection production module 82 may be implemented for example in a federated learning or swarm learning framework. Of course, these are just example implementations and the disclosed technology is not limited thereto.

The production environment at each participant node is provided by the anomalies and drift detection production module 82. The anomalies and drift detection production module 82 includes trained user local ML model 124, trained user global ML model 126, trained local VAE 120, trained global VAE 122, and comparator 132. At the production environment, the trained local VAE 120 and the trained global VAE 122 are deployed along with the respective local and global baselines stored in respective local and global baseline databases 128, 130. Production data is processed with the trained user local ML model 124 and the trained user global ML model 126. The trained local and global VAEs 120, 122 extract anomalies and drift with respect to the respective local and global baselines, if any new data is obtained at the node. This can be based on actual production or live data. The data is clustered and fed into a statistical ensemble for drift assessment provided by the trained local and global VAEs 120, 122 and comparator 132, as described in further detail in connection with the method 500 of FIG. 5 which shows an example of a method of anomaly and drift detection at inference.

The trained local and global VAEs 120, 122 derive at least one of (1) local and global anomaly data regarding anomalous production data, or (2) local and global drift data regarding drifting production data, based on the respective local and global training data reference baselines. The comparator 132 then compares at least one of (1) the local anomaly data with the global anomaly data or (2) the local drift data with the global drift data, to quantify detected anomalies and data drift. More particularly, the comparator 132 assesses the quantity of anomalies and/or data drift across the trained local and global VAEs 120, 122 along with ML model performance from the trained user local and global ML Models 124, 126. The comparator 132 then sends the outcome to database 134 for storing and presents the outcome to a user.

The outcome may include, for example, anomaly and drift data and associated model predictions. Accordingly, a user is able to understand the impact of the new data (i.e., the anomalous production data or the drifting production data) on the trained user local and/or global ML models 124, 126. The user is further enabled to make an informed decision whether to initiate a re-train of the user local and/or global ML models 124, 126, and the local and global VAEs 120, 122, in the decentralized/distributed network such as network 102 of FIG. 1A, based on the impact on user model predictions due to the new data that are anomalous or drifting. As one example, the user model may erroneously predict new COVID-19 images data as Cardiomegaly disease class. By virtue of the features of the disclosed technology, a continuous training can be enabled to obtain updated user local and/or global ML models 124, 126 across participating nodes using this new data detected as anomalies or drift.

Accordingly, the disclosed technology derives a global reference baseline for assessing the impact of anomalies and drifting data for a trained global ML model on a decentralized/distributed or federated or swarm learning network, without having access to data across participant nodes, using a novel drift analysis workflow/pipeline for robust drift assessment. The disclosed technology can distinguish the impact of drifting data on a local and/or global ML model with their associated performance data, thereby enabling a user to make an informed decision whether to re-train the network with the drifting data.

By virtue of the disclosed technology, participant nodes in the network can be provided with regularly updated local and/or global ML models. A global ML model can be generated irrespective of where the data drift occurs across the participating nodes. Moreover, sustained ML model performance through continual re-training of the local and/or global models under dynamic production data scenarios can be attained, while preserving privacy.

Components of the disclosed technology in FIGS. 2 and 3 above are described in more detail as follows.

The Local and Global Variational Autoencoders (VAEs) 120, 122

As noted above, the disclosed technology utilizes variational autoencoders (VAEs) as the primary engine for enabling anomaly and drift detection in decentralized/distributed, federated, or swarm learning environments. More specifically, local and global VAEs 120, 122 are utilized in FIGS. 2 and 3. A VAE is an unsupervised artificial neural network that learns how to efficiently compress and encode data into a latent space and reconstruct the data back from the reduced encoded representation. A VAE is chosen because the encoded representation learned by the VAE is specific to the training data distribution in a continuous latent space. This enables to effectively calculate the differences in latent space distribution of input data using the global and local baselines. This behavior is leveraged in the disclosed technology for effective detection of differences in drift and/or anomalies to aid a user in assessing the impact of anomalous production data and/or drifting production data on the local and/or global ML models.

The User Local and Global ML Models 124, 126

At each node, a user builds a model for training with data available at the local node that can be saved after training as, e.g., User Local ML Model 124. Across a plurality of nodes (three nodes in one non-limiting example) the same ML model is used for training in a decentralized/distributed learning environment such as federated learning or swarm learning, that can be saved after training as, e.g., User Global ML Model 126.

Baseline Reference Derivation

With respect to the local baseline reference at each node stored in the local baseline database 128, the local VAE 120 at the training environment is trained with the same data as the user local ML Model 124, until the local VAE 120 is able to reconstruct the expected output with minimum or reduced errors that are the reconstruction loss values. A local baseline (LBd) is derived that comprises the stabilized loss values and associated encoder latent space, representing local data. This is used as a reference for drift analysis at inference for the local ML Model 124.

With respect to the global baseline reference across participating nodes as stored in the global baseline database 130, the global VAE 122 is collaboratively trained across a plurality of participating nodes using decentralized/distributed learning such as federated or swarm learning until the global VAE 122 is able to reconstruct the expected output with minimum or reduced errors that are the reconstruction loss values. A global baseline (GBd) is derived that comprises the stabilized loss values and associated VAE encoder latent space, representing data distributed across the nodes. This is used as a reference for drift analysis at inference for the global ML model 126.

Figure 4:
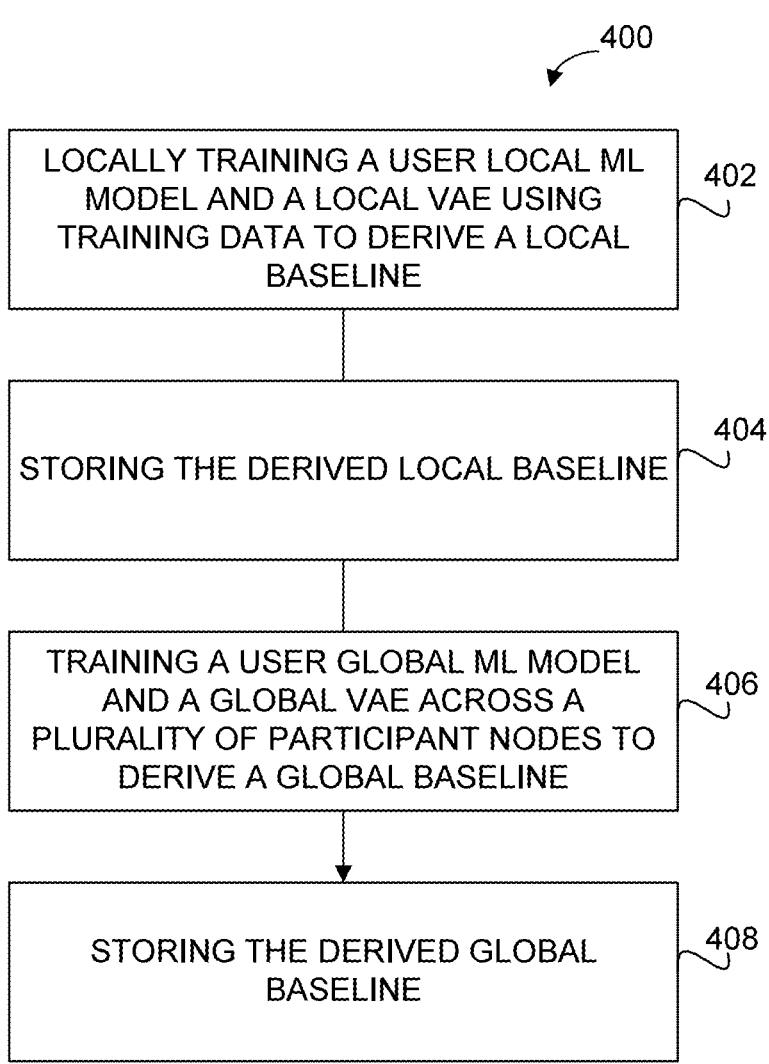
FIG. 4 illustrates an anomalies and drift detection training method in accordance with an example of the disclosed technology.

Training the Local and Global VAEs 120, 122 for Anomalies and Drift Detection FIG. 4 illustrates an anomalies and drift detection training method 400 in accordance with an example of the disclosed technology. The method 400 may be performed for example by local or global VAEs 120, 122 of anomalies and drift detection training module 80 which may provide a training environment at each participant node. The anomalies and drift detection training module 80 may be implemented in a management node or edge node of a decentralized or distributed network such as management node 12 or edge node 10 of FIGS. 1B and 1C, respectively. The network may be a federated learning or swarm learning framework. Of course, these are just example implementations and the disclosed technology is not limited thereto.

Step 402 includes locally training a user local ML model 124 and local VAE 120 using training data to derive a local baseline. Step 404 includes storing the derived local baseline in a local baseline database 128. The local baseline provides a representative reference of training data of that node.

Step 406 includes collaboratively training user global ML model 126 and global VAE 122 across a plurality of participant nodes (which may be either management node 12 or edge nodes 10) using the training data to derive a global baseline. Step 408 includes storing the derived global baseline in a global baseline database 130. The global baseline provides a representative approximate reference of the training data across some or all participant nodes.

Accordingly the method 400 extracts, by the local and global VAEs 120, 122 stabilized reconstruction losses and latent space as the local and global baselines. Thus anomalies and drift can be assessed from both local and global perspectives. The local and global baselines are used as references for anomalies and drift detection at production. The local and global baselines and the respective trained local and global VAEs 120, 122 are packaged for deployment at the production environment provided by the anomalies and drift detection production module 82.

Anomalies and Drift Detection at Inference

FIG. 5 illustrates a method 500 performed by local or global VAE 120, 122 and comparator 132 of the anomalies and drift detection production module 82 according to an example of the present disclosure. The method 500 is an example of an anomaly and drift detection method at inference.

The trained local VAE 120 which derives the local baseline, and the trained global VAE 122 which derives the global baseline, are deployed at inference. The user also deploys the local and global ML models 124, 126 at inference. Inference refers to anomaly and drift detection at production. In the production environment as provided by the anomalies drift detection production module 82, the local and global ML models 124, 126 receive production data as inputs and reconstruct the images. The following sequence of functions are applied to the input production data. They may be common to both the local VAE 120 and the global VAE 122.

Accordingly Step 502 includes deploying the trained local VAE 120 and the trained global VAE 122 with corresponding local and global baselines at inference nodes.

Step 504 includes receiving, by the local or global VAE 120, 122, the input production data as well as the respective local and global baselines stored in the respective local and global baseline databases 128, 130.

Step 506 includes extracting reconstruction losses and latent spaces from the received production data. In this step, reconstruction losses and latent spaces are extracted from the encoder of the local VAE 120 (AD_Local_Latent) and the global VAE 122 (AD_Global_Latent).

Step 508 includes performing data clustering on the reconstruction losses and the latent spaces extracted from the local and global VAEs 120, 122 to thereby generate a set of clusters. This functionality employs, as an example, Mean Shift Clustering on the extracted reconstruction losses and on the encoder latent spaces extracted from the local and global VAEs 120, 122, thereby generating a set of clusters $C=(C1, C2, \ldots Ci \ldots, Cn)$. These clusters C are used for anomaly and drift detection described herein. The following steps focus on analysis based on latent space as an example, while a similar process is adopted for analysis based on reconstruction losses, to support a collective approach for anomaly and drift detection for improved robustness.

Step 510 includes detecting and extracting outliers or anomalies from the generated clusters C using the local or global baselines stored in the respective local or global baseline databases 128, 130. The detection and extraction is characterized by a set of rules such as, in one non-limiting example, identifying a high density cluster and detecting and extracting data point(s) having maximum distance (or a threshold distance) from a high density cluster. Accordingly, in one non-limiting example anomalies are detected and extracted by identifying a high density cluster and detecting and extracting data points that are furthest from the high density cluster and above a maximum value of the derived baseline. Anomalies may be considered as above the baseline maximum value and furthest away from the highest density cluster. If the highest density cluster itself is above the baseline, then the topmost values of the cluster are the anomalies. The topmost values can be a percentage tuned by a user of the total points above the baseline in the cluster.

In another non-limiting example the detection and extraction is characterized by detecting and extracting data point(s) having a significantly small count of values. The values may be assessed by also verifying that a value is less than or greater than valid watermarks in baseline data that a user may specify. Accordingly a user may specify criteria for the detecting and extracting. The anomalies extracted from the clusters C are tagged as anomalies.

Step 512 includes detecting data drift in the generated clusters using the local or global baselines stored in the respective local or global baseline databases 128, 130. When a drift occurs, the density of the clusters will tend to change temporally. Data drift can be detected by assessing the density changes of the clusters of data for each data batch fed into the cluster generating step 506. A change in density over a period of time across clusters per batch consistently with reference to the baseline for a duration is indicative of a drift or deviation of data pattern. Accordingly in this step cluster density assessment is performed and drift is derived. Local and/or global anomalies and drift detection are performed by assessing the change in density across clusters against the local baseline (LBd) and the global baseline (GBd).

Step 514 includes performing, by the comparator 132, a comparison of local and/or global anomalies and/or drift. More particularly, this step includes comparing at least one of (1) the local anomaly data with the global anomaly data or (2) the local drift data with the global drift data, to derive respective anomalous production data or drifting production data. The comparator 132 uses a cross-correlation measure (in one non-limiting example, Pearson's correlation) to obtain a cross-correlation value, and a non-parametric test (in one non-limiting example, the Mann Whitney test with the hypothesis that the two distributions are significantly similar) for density distribution comparison. For each run of clustering, a density set DS; comprising the clusters is created, in which $DS_i=\{DS_1, DS_2, \ldots DS_n\}$ in a temporal order across runs, where $DS_i=\{C1, \ldots, Ci\}$ over a tunable time window. A density count of each cluster is saved in the density set $DS_i$.

An ensemble is executed across the density set DSi and the baselines LBd and GBd in a temporal manner based on the following assessment logic example as shown in the following Table 1. It is of course to be understood that the assessment logic shown in Table 1 is merely one example, and the disclosed technology is not limited to the example presented therein.

TABLE 1

| Assessment | Outcome | Significance |
|---|---|---|
| If (cross_correlation_value < similarity_threshold, e.g. 0.5) AND (hypothesis = Reject) | Drift occurred across cluster sets | The clustered datasets are from different distributions |
| If (cross_correlation_value > similarity_threshold, e.g. 0.5) AND (hypothesis = Fail to reject) | No drift across cluster sets | The datasets clusters are most probably from the same distribution |
| If (cross_correlation_value < similarity_threshold, e.g. 0.5) AND (hypothesis = Fail to reject) | Marginal drift or anomalous data influence | Tag as marginal drift and monitor for more batches of data |
| If (cross_correlation_value > similarity_threshold, e.g. 0.5) AND (hypothesis = Reject) | Marginal drift or anomalous data influence | Tag as marginal drift and monitor for more batches of data |

Accordingly, Table 1 provides an example algorithm for extracting anomaly/drift using clustering. In the example provided in Table 1, a numerical value of 0.5 is given as the similarity threshold, which informs the extent to which the data distributions are similar, and can be tunable by a user. (0.5 is a non-limiting example.) Typically, data points outside the baseline are classified as anomalies, while data inside the baseline are not classified as anomalies. Using both cross-correlation and hypothesis-based rules helps to reduce false positives, as with any single technique it can be more difficult to reduce false positives.

Trending is performed on the drift outcome to determine the rate of change in drift using cross correlation values. Drifting data clusters are extracted from the cluster set for the local baseline (AD_Local_Drift_Clusters) and for the global baseline (AD_Global_Drift_Clusters) using the respective VAEs 120, 122.

The comparator can compare local vs. global drift. This function compares the drifts detected by the VAEs 120, 122. The following assessment logic example as shown in Table 2 is performed and presented to a user as observations. It is of course to be understood that the assessment logic shown in Table 2 is merely one example, and the disclosed technology is not limited to the example presented therein:

there is no baseline value less than what was derived. Thus, immediately, reconstruction loss will be high, i.e., above a threshold. As one example, if day 1 showed 1 cluster, day 2 showed 2 clusters, and day 3 showed 3 clusters, it can be said that the amount of data is continuously increasing and thus the data is drifting. The change in temporal density across clusters that occurs consistently can be a drift scenario. Hence, when data density changes in this manner, it can be determined that drift is occurring on that specific node. There could be other examples, wherein the change in temporal density can be a sudden rise or oscillatory, that is detected by this algorithm.

Step 516 includes deriving and presenting the impact of drift on the local ML model 124 vs. the global ML model 126 to a user. More particularly, Step 514 includes deriving and presenting the impact on user ML Model predictions, an erroneous prediction as an example, of the at least one of the anomalous production data or the drifting production data on the local and global ML models 124, 126. This can be in the form of, e.g., anomaly and drift data, or associated model predictions, stored in the outcome database 134.

For example, in this step drift may be classified as follows. A difference between AD_Local_Latent and AD_Global_Latent vectors with either LBd and GBd latent spaces,

TABLE 2

| Assessment | Outcome | User actions |
|---|---|---|
| If (AD_Local_Drift_Clusters = 0) AND AD_Global_Drift_Clusters = 0) | No drift | No action |
| If (AD_Local_Drift_Clusters = Positive Count) AND (AD_Global_Drift_Clusters = 0) | High probability that the federated ML model performance is not impacted | Examine drifting data and study local ML Model output vs Global Model output |
| If (AD_Local_Drift_Clusters = Positive Count) AND (AD_Global_Drift_Clusters = Positive Count) | High probability that the federated ML model performance is impacted. | Examine drifting data. Re-trigger federated learning with new data based on participant consensus |
| If (AD_Local_Drift_Clusters = 0) AND (AD_Global_Drift_Clusters = Positive Count) | High probability that federated ML model performance is impacted. Local Model performing well. | Examine drifting data. Re-trigger federated learning with new data based on participants consensus |

Table 2 provides an example of a drift detection algorithm. Returning to the Covid-19 example, assume production data is available (Covid-19) at day 1 of 20 x-rays; at day 2 of 30 x-rays; etc. A separate cluster starts forming, and or any latent space during a no drift scenario at production, provides the region around the input data where the drift has occurred. This enables a user to study the associated input images causing drift with the corresponding ML Model classification to assess model performance. The user can then, for example, re-train the ML model with the data corresponding to the drift for refinement of the global model.

Step 518 includes triggering by the user re-training of at least one of the local and global ML models 124, 126 based on the impact on user ML Model predictions, an erroneous prediction as an example. The user can decide based on the presentation whether to discard or re-train.

FIG. 6 is an example computing component that may be used to implement anomalies and drift detection functions of a node in accordance with an example of the disclosed technology. Computing component 600 may be integrated in a node of a decentralized, distributed, federated learning, or swarm learning framework such as management node 12 or edge node 10 of the computer network 102 of FIG. 1A. The computing component 600 may be, for example, a server computer, a controller, or any other similar computing component capable of processing data. In the example implementation of FIG. 6, the computing component 600 includes a hardware processor 602 and machine-readable storage medium 604. In some examples, computing component 600 may be an embodiment of processor 20 of management node 12 of FIG. 1B, or may be an embodiment of processor 50 of edge node 10 of FIG. 1C.

Hardware processor 602 may be one or more central processing units (CPUs), semiconductor-based microprocessors, and/or other hardware devices suitable for retrieval and execution of instructions stored in machine-readable storage medium 604. Hardware processor 602 may fetch, decode, and execute instructions, such as instructions 606-616, to control processes or operations for performing anomalies and drift detection functions of a node. As an alternative to or in addition to retrieving and executing instructions, hardware processor 602 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 604, may be any electronic, magnetic, optical, or other physical storage device that contains or stores executable instructions. Thus, machine-readable storage medium 604 may be, for example, Random Access Memory (RAM), non-volatile RAM (NVRAM), an Electrically Erasable Programmable Read-Only Memory (EEPROM), a storage device, an optical disc, and the like. In some examples, machine-readable storage medium 604 may be a non-transitory storage medium, where the term "non-transitory" does not encompass transitory propagating signals. As described in detail below, machine-readable storage medium 304 may be encoded with executable instructions, for example, instructions 606-616.

Hardware processor 602 may execute instruction 606 to train, at a first node of a federated learning network, a local unsupervised autoencoder and obtain a local training data reference baseline for the first node. Hardware processor 602 may execute instruction 608 to deploy at the first node (1) the local unsupervised autoencoder along with the local training data reference baseline, and (2) a global unsupervised autoencoder trained across a plurality of nodes, along with a corresponding global training data reference baseline.

Hardware processor 602 may execute instruction 610 to process production data at the first node with a local machine learning model and a global machine learning model, and derive at least one of (1) local and global anomaly data regarding anomalous production data or (2) local and global drift data regarding drifting production data based on the local training data reference baseline and the global training data reference baseline, respectively. Hardware processor 602 may execute instruction 612 to compare at least one of (1) the local anomaly data with the global anomaly data or (2) the local drift data with the global drift data. Hardware processor 602 may execute instruction 614 to assess and present the impact on user ML Model predictions, an erroneous prediction as an example of the at least one of the anomalous production data or the drifting production data on the local and global machine learning models. Hardware processor 602 may execute instruction 616 to trigger re-training of at least one of the local and global machine learning models based on the impact on user ML Model predictions, an erroneous prediction as an example.

The disclosed technology enables obtaining local and global reference baselines using VAEs for assessing the impact of anomalies and drifting data on a locally trained user ML model and a global ML model when deployed at production. This helps to distinguish the impact of drifting data on both ML models thereby enabling a user to make an informed decision to re-train at least one of the ML models using the drifting data or based on the impact on user ML Model predictions, an erroneous prediction as an example.

The disclosed technology uses an unsupervised learning technique via local and global VAEs, deriving a latent space specific to both the local and global VAEs, and representing the local and distributed data thereby enabling effective and robust determination of anomalies and drift for user ML Models. The disclosed technology uses statistical ensemble-based assessment logic for drift analysis that helps to mitigate false drift triggers, thereby improving the robustness of the drift analysis.

By virtue of the features of the disclosed technology, the capability to generate a global model can be provided irrespective of where the data drift occurs across the participating nodes. Participant nodes need not have access to individual node data to assess anomalies or data drift against the global model, thereby preserving privacy. Sustained ML model performance can be provided through continual re-training of the global model under dynamic production data scenarios while preserving privacy. Robustness in drift detection can be provided due to ensemble method of drift analysis.

The disclosed technology can be extended to automatically trigger decentralized/distributed federated or swarm learning through user defined rules or smart contracts.

A plugin-based solution can be provided to enable seamless enhancements to architecture of the autoencoder or variants.

Figure 7:
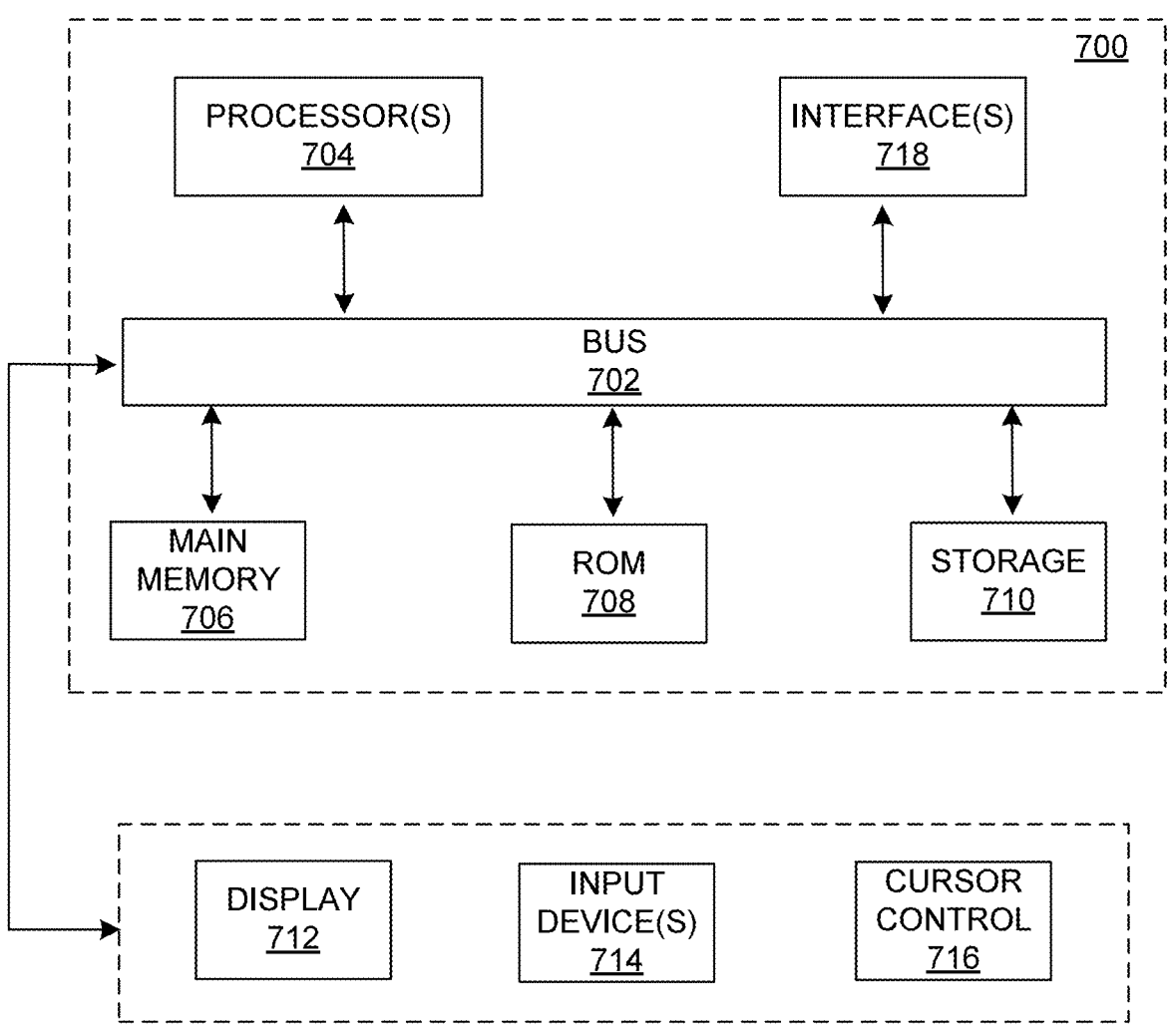
FIG. 7 is an example computing component that may be used to implement various features of embodiments described in the present disclosure.

FIG. 7 depicts a block diagram of an example computer system 700 in which various of the examples described herein may be implemented, including but not limited to edge node 10, management node 12, anomalies and drift detection training module 80, anomalies and drift detection production module 82, local VAE 120, global VAE 122, and computing component 600. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), is provided and coupled to bus 702 for storing information and instructions.

The computer system 700 may be coupled via bus 702 to a display 712, such as a liquid crystal display (LCD) (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. In some examples, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one example, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative examples, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

The computer system 700 also includes a communication interface 718 coupled to bus 702. Communication interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed examples. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 700.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A computing component at a first node, comprising:

at least one processor; and a memory operatively connected to the at least one processor, the memory including instructions that, when executed, cause the at least one processor to:

obtain a local training data reference baseline for the first node of a decentralized learning network, by training, at the first node, a local variational autoencoder, wherein the local variational autoencoder is an unsupervised artificial neural network that is configured to compress and encode training data into a continuous latent space and subsequently reconstruct the training data;

deploy at the first node, (1) the local variational autoencoder along with the local training data reference baseline, and (2) a global variational autoencoder trained across a plurality of nodes, along with a corresponding global training data reference baseline;

process production data at the first node with a local machine learning model and a global machine learning model, and derive local and global anomaly data regarding anomalous production data based on the local training data reference baseline and the global training data reference baseline, respectively, by:

extracting reconstruction losses and latent spaces from the production data, generating clusters from the extracted reconstruction losses and latent spaces, detecting and extracting anomalies from the generated clusters, and detecting data drift in the generated clusters using the respective local or global training data reference baselines;

compare the local anomaly data with the global anomaly data;

assess and present impact on user ML model predictions of the anomalous production data on the local and global machine learning models; and trigger re-training of at least one of the local and global machine learning models based on the impact on user ML model predictions.

2. The computing component of claim 1, wherein the clusters are generated using Mean Shift Clustering on the extracted reconstruction losses and latent spaces.

3. The computing component of claim 1, wherein:

to detect and to extract the anomalies, the memory includes instructions that when executed further cause the at least one processor to identify a high density cluster and detect and extract data points that are furthest from the high density cluster and above a maximum value of the respective local or global training data reference baselines; and the high density cluster is identified based, at least in part, on a density distribution comparison that compares the density counts for the clusters with respect to one another.

4. The computing component of claim 1, wherein the memory includes instructions that when executed further cause the at least one processor to detect the data drift using cross-correlation values of the generated clusters to determine a rate of change in the data drift.

5. The computing component of claim 1, wherein the memory includes instructions that when executed further cause the at least one processor to detect the data drift by assessing density changes of the generated clusters over a period of time for each data batch across clusters per data batch, with reference to the local or global training data reference baselines.

6. The computing component of claim 1, wherein the memory includes instructions that when executed further cause the at least one processor to compare the local anomaly data with the global anomaly data using a density distribution comparison.

7. A computer-implemented method, comprising:

training, at a first node of a decentralized learning network, a local variational autoencoder and obtaining a local training data reference baseline for the first node, wherein the local variational autoencoder is an unsupervised artificial neural network and the training comprises compressing and encoding training data into a continuous latent space and subsequently reconstructing the training data;

training, across a plurality of participating nodes, a global variational autoencoder and obtaining a corresponding global training data reference baseline;

deploying at the first node, (1) the local variational autoencoder along with the local training data reference baseline, and (2) the global variational autoencoder trained across a plurality of nodes, along with the corresponding global training data reference baseline;

processing production data at the first node with a local machine learning model and a global machine learning model deployed by a user, and deriving local and global anomaly data regarding anomalous production data based on the local training data reference baseline and the global training data reference baseline, respectively, by:

extracting reconstruction losses and latent spaces from the production data, generating clusters from the extracted reconstruction losses and latent spaces, detecting and extracting anomalies from the generated clusters, and detecting data drift in the generated clusters using the respective local or global training data reference baselines;

comparing the local anomaly data with the global anomaly data;

assessing and presenting impact on user ML Model predictions of the anomalous production data on the local and global machine learning models; and triggering (1) discarding of the anomalous production data or (2) re-training of at least one of the local and global machine learning models, based on the impact on user ML Model predictions.

8. The method of claim 7, wherein the clusters are generated using Mean Shift Clustering on the extracted reconstruction losses and latent spaces.

9. The method of claim 7, wherein the detecting and the extracting anomalies comprises identifying a high density cluster and detecting and extracting data points that are furthest from the high density cluster and above the maximum value of the respective local or global training data reference baselines; and the high density cluster is identified based, at least in part, on a density distribution comparison that compares density counts for the clusters with respect to one another.

10. The method of claim 7, further comprising detecting the data drift using cross-correlation values of the generated clusters to determine a rate of change in the data drift.

11. The method of claim 7, further comprising detecting the data drift by assessing density changes of the generated clusters over a period of time for each data batch across clusters per data batch, with reference to the local or global training data reference baselines.

12. The method of claim 7, in which the comparing of the local anomaly data with the global anomaly data is performed using a density distribution comparison.

13. The method of claim 7, further comprising:

processing the production data at the first node with the local machine learning model and the global machine learning model deployed by a user, and deriving local and global drift data regarding drifting production data based on the local training data reference baseline and the global training data reference baseline, respectively;

comparing the local drift data with the global drift data;

assessing and presenting impact on user ML Model predictions of the drifting production data on the local and global machine learning models; and triggering (1) discarding of the drifting production data or (2) re-training of at least one of the local and global machine learning models, based on the impact on user ML Model predictions.

14. A node operating in a decentralized learning network, comprising:

at least one processor; and a memory operatively connected to the at least one processor, the memory including instructions that, when executed, cause the at least one processor to:

obtain a local training data reference baseline for the node, by training, at the node, a local variational autoencoder, wherein the local variational autoencoder is an unsupervised artificial neural network that is configured to compress and encode training data into a continuous latent space and subsequently reconstruct the training data;

deploy at the node (1) the local variational autoencoder along with the local training data reference baseline and (2) a global variational autoencoder trained across a plurality of nodes in the decentralized learning network, along with a corresponding global training data reference baseline;

process production data at the node with a local machine learning model and a global machine learning model, and derive local and global drift data regarding drifting production data based on the local training data reference baseline and the global training data reference baseline, respectively, by:

extracting reconstruction losses and latent spaces from the production data, generating clusters from the extracted reconstruction losses and latent spaces, detecting and extracting anomalies from the generated clusters, and detecting data drift in the generated clusters using the respective local or global training data reference baselines;

compare the local drift data with the global drift data;

assess and present impact on user ML Model predictions of the drifting production data on the local and global machine learning models; and implement a decision with respect to at least one of the local and global machine learning models based on the impact on user ML Model predictions.

15. The node of claim 14, wherein the decision includes either (1) discarding the drifting production data or (2) re-training of at least one of the local and global machine learning models.

* * * * *